(12) United States Patent
Boettcher et al.

(10) Patent No.: US 11,507,475 B2
(45) Date of Patent: Nov. 22, 2022

(54) ERROR DETECTION USING VECTOR PROCESSING CIRCUITRY

(71) Applicant: Arm Limited, Cambridge (GB)

(72) Inventors: Matthias Lothar Boettcher, Cambridge (GB); Mbou Eyole, Soham (GB); Nathanael Premillieu, Antibus (FR)

(73) Assignee: Arm Limited, Cambridge (GB)

( * ) Notice: Subject to any disclaimer, the term of this patent is extended or adjusted under 35 U.S.C. 154(b) by 702 days.

(21) Appl. No.: 16/475,487

(22) PCT Filed: Dec. 12, 2017

(86) PCT No.: PCT/GB2017/053712
§ 371 (c)(1),
(2) Date: Jul. 2, 2019

(87) PCT Pub. No.: WO2018/138467
PCT Pub. Date: Aug. 2, 2018

(65) Prior Publication Data
US 2019/0340054 A1     Nov. 7, 2019

(30) Foreign Application Priority Data
Jan. 24, 2017   (GB) ..................................... 1701163

(51) Int. Cl.
*G06F 11/00* (2006.01)
*G06F 11/16* (2006.01)
(Continued)

(52) U.S. Cl.
CPC ...... *G06F 11/1637* (2013.01); *G06F 9/30036* (2013.01); *G06F 9/30043* (2013.01);
(Continued)

(58) Field of Classification Search
CPC ............. G06F 11/0721; G06F 11/0751; G06F 11/1405; G06F 11/1629; G06F 11/1637;
(Continued)

(56) References Cited

U.S. PATENT DOCUMENTS

| 8,418,154 B2 * | 4/2013 | McAllister | .......... G06F 9/30036 712/234 |
|---|---|---|---|
| 2006/0190700 A1 * | 8/2006 | Altman | ............... G06F 11/1641 712/7 |

(Continued)

FOREIGN PATENT DOCUMENTS

WO     2017/117317     7/2017

OTHER PUBLICATIONS

Chen, Zhi, Ryoichi Inagaki, Alexandru Nicolau, and Alexander V. Veidenbaum. "Software fault tolerance for FPUs via vectorization." In 2015 International Conference on Embedded Computer Systems: Architectures, Modeling, and Simulation (SAMOS), pp. 203-210. IEEE, 2015. (Year: 2015).*

(Continued)

*Primary Examiner* — Anthony J Amoroso
(74) *Attorney, Agent, or Firm* — Nixon & Vanderhye P.C.

(57) ABSTRACT

A data processing apparatus (2) has scalar processing circuitry (32-42) and vector processing circuitry (38, 40, 42). When executing main scalar processing on the scalar processing circuitry (32-42), or main vector processing using a subset of said plurality of lanes on the vector processing circuitry (38, 40, 42), checker processing is executed using at least one lane of the plurality of lanes on the vector processing circuitry (38, 40, 42), the checker processing comprising operations corresponding to at least part of the main scalar/vector processing. Errors can then be detected based on a comparison of an outcome of the main processing and an outcome of the checker processing. This provides a (Continued)

technique for achieving functional safety in a high end processor with better performance and reduced hardware cost compared to a dual/triple core lockstep approach.

28 Claims, 8 Drawing Sheets

(51) Int. Cl.
*G06F 9/30* (2018.01)
*G06F 11/07* (2006.01)
*G06F 9/38* (2018.01)

(52) U.S. Cl.
CPC ........ *G06F 9/30145* (2013.01); *G06F 9/3836* (2013.01); *G06F 9/3889* (2013.01); *G06F 11/0721* (2013.01); *G06F 11/0751* (2013.01); *G06F 11/1683* (2013.01); *G06F 11/1679* (2013.01); *G06F 2201/845* (2013.01)

(58) Field of Classification Search
CPC ............. G06F 11/1641; G06F 11/1679; G06F 11/1683; G06F 9/30036; G06F 9/30043; G06F 9/30145; G06F 9/3836; G06F 9/3889; G06F 9/3017; G06F 8/41; G06F 2201/845
See application file for complete search history.

(56) References Cited

U.S. PATENT DOCUMENTS

| | | |
|---|---|---|
| 2010/0106944 A1 | 4/2010 | Symes et al. |
| 2012/0113271 A1* | 5/2012 | Haraguchi ............ G06F 9/3861 |
| | | 712/E9.023 |
| 2014/0156975 A1* | 6/2014 | Sridharan ........... G06F 11/1691 |
| | | 712/227 |

OTHER PUBLICATIONS

Flynn, Michael J. "Instruction decoding." In Encyclopedia of Computer Science, pp. 882-883. 2003. (Year: 2003).*
International Search Report for PCT/GB2017/053712, dated Mar. 7, 2018, 4 pages.
Written Opinion of the ISA for PCT/GB2017/053712, dated Mar. 7, 2018, 8 pages.
Combined Search and Examination Report for GB1701163.6, dated Aug. 4, 2017, 7 pages.
Chen et al., "Software fault tolerance for FPUs via vectorization", 2015 International Conference on Embedded Computer Systems: Architectures, Modeling, and Simulation (SAMOS), IEEE, Jul. 19, 2015, pp. 203-210.
Hofmann et al., "Comparing the Performance of Different x86 SIMD Instruction Sets for a Medical Imaging Application on Modem Multi- and Manycore Chips", arxiv.org, WPMVP '14, Jan. 29, 2014, 8 pages.
Office Action for KR Application No. 10-2019-7022952 dated Jun. 23, 2022 and English translation, 16 pages.

* cited by examiner

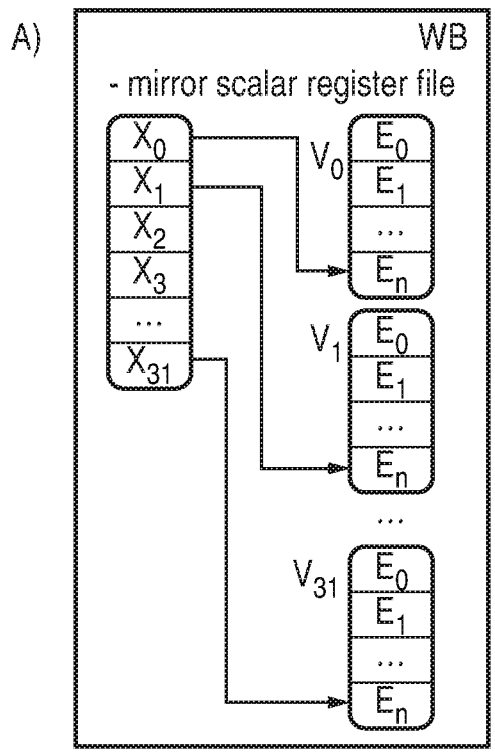
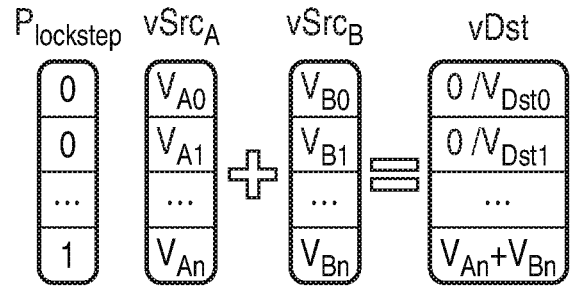
FIG. 2

C code example

```
total = 0;
for (i = 10; i > 0; i--) {
    total += i;
}
``` assembly code

```
        MOV   R0, #0    ; R0 accumulates total
        MOV   R1, #10   ; R1 counts down from 10
loop:   ADD   R0, R0, R1
        SUBS  R1, R1, #1
        BNE   loop
        STR   R0, <dst>
``` compiled assembly including lockstep integration

< init. P0 (once) > ;Lockstep predicate

```
        MOV   R0, #0                ; R0 accumulates total
        VDUP  V0, #0, P0            ; V0[n] accumulates total
        MOV   R1, #10               ; R1 counts down from 10
        VDUP  V1, #10, P0           ; V1 counts down from 10
loop:
        ADD   R0, R0, R1
        VADD  V0, V0, V1, P0
        SUBS  R1, R1, #1
        VSUB  V1, V1, #1, P0
        <optional check of R1 against V1 >
        BNE   loop
        ;;;
        VDUP  Vx, R0, P0            ;Helper vector to hold R0
        VCMP  V0, Vx, P0
        BNE   fault_detected
        STR   R0, <dst>
```

FIG. 5

ERROR DETECTION USING VECTOR PROCESSING CIRCUITRY

This application is the U.S. national phase of International Application No. PCT/GB2017/053712 filed 12 Dec. 2017, which designated the U.S. and claims priority to GB Patent Application No. 1701163.6 filed 24 Jan. 2017, the entire contents of each of which are hereby incorporated by reference.

The present technique relates to the field of data processing. More particularly, it relates to error detection.

Data processing apparatuses may be subject to random hardware faults, e.g. permanent faults caused by a short circuit or a broken via in an integrated circuit, or temporary faults such as bit flips caused by exposure to natural radiation or particle strikes. For some fields of use, e.g. in the automotive field where safety can be critical, to ensure functional safety a processor can be provided with error detection mechanisms for detecting errors and ensuring safe operation in the presence of such errors. However, providing such error detection mechanisms can have an impact on the performance achieved for the regular processing being performed by the processor, and on the circuit area and power consumption overheads of the processor.

At least one example provides an error detection method for a data processing apparatus comprising scalar processing circuitry to perform scalar processing of scalar operands and vector processing circuitry to perform vector processing comprising a plurality of lanes of processing performed on vector operands comprising a plurality of data elements;

the method comprising:

executing main processing comprising at least one of: main scalar processing on the scalar processing circuitry, and main vector processing using a subset of said plurality of lanes on the vector processing circuitry;

executing checker processing using at least one lane of said plurality of lanes on the vector processing circuitry, the checker processing comprising operations corresponding to at least part of the main processing; and performing error detection in dependence on a comparison of an outcome of said at least part of the main processing and an outcome of the checker processing.

At least one example provides a method of compiling a sequence of instructions for execution by a data processing apparatus comprising scalar processing circuitry to perform scalar processing of scalar operands and vector processing circuitry to perform vector processing comprising a plurality of lanes of processing performed on vector operands comprising a plurality of data elements; the method comprising:

receiving a first sequence of instructions defining main processing to be executed by the data processing apparatus, the main processing comprising at least one of: main scalar processing to be executed using the scalar processing circuitry, and main vector processing to be executed using the vector processing circuitry; and mapping the first sequence of instructions to a second sequence of instructions comprising instructions for controlling the data processing apparatus to execute at least:

the main processing;

checker processing executed using at least one lane of said plurality of lanes, the checker processing comprising operations corresponding to at least part of the main processing; and an error detection operation dependent on a comparison of an outcome of said at least part of the main processing and an outcome of the checker processing.

A computer program may be provided for controlling a data processing apparatus to perform either of the methods described above. The computer program may be stored on a storage medium. The storage medium may be a non-transitory medium.

At least one example provides a data processing apparatus comprising:

scalar processing circuitry to perform scalar processing of scalar operands;

vector processing circuitry to perform vector processing comprising a plurality of lanes of processing performed on vector operands comprising a plurality of data elements; and control circuitry to control the vector processing circuitry to perform checker processing using at least one lane of said plurality of lanes, the checker processing comprising operations corresponding to at least part of main processing comprising at least one of: main scalar processing processed on the scalar processing circuitry, and main vector processing processed using a subset of said plurality of lanes on the vector processing circuitry; and error detection circuitry to perform error detection in dependence on a comparison of an outcome of said at least part of the main processing and an outcome of the checker processing.

Further aspects, features and advantages of the present technique will be apparent from the following description of examples, which is to be read in conjunction with the accompanying drawings, in which:

FIG. 1 schematically illustrates an example of data processing system including scalar processing circuitry and vector processing circuitry;

FIG. 2 schematically illustrates use of a lane of the vector processing circuitry for checking errors in scalar processing performed by the scalar processing circuitry;

FIG. 5 shows an example illustrating the generation of the compiled code;

Figure 1:
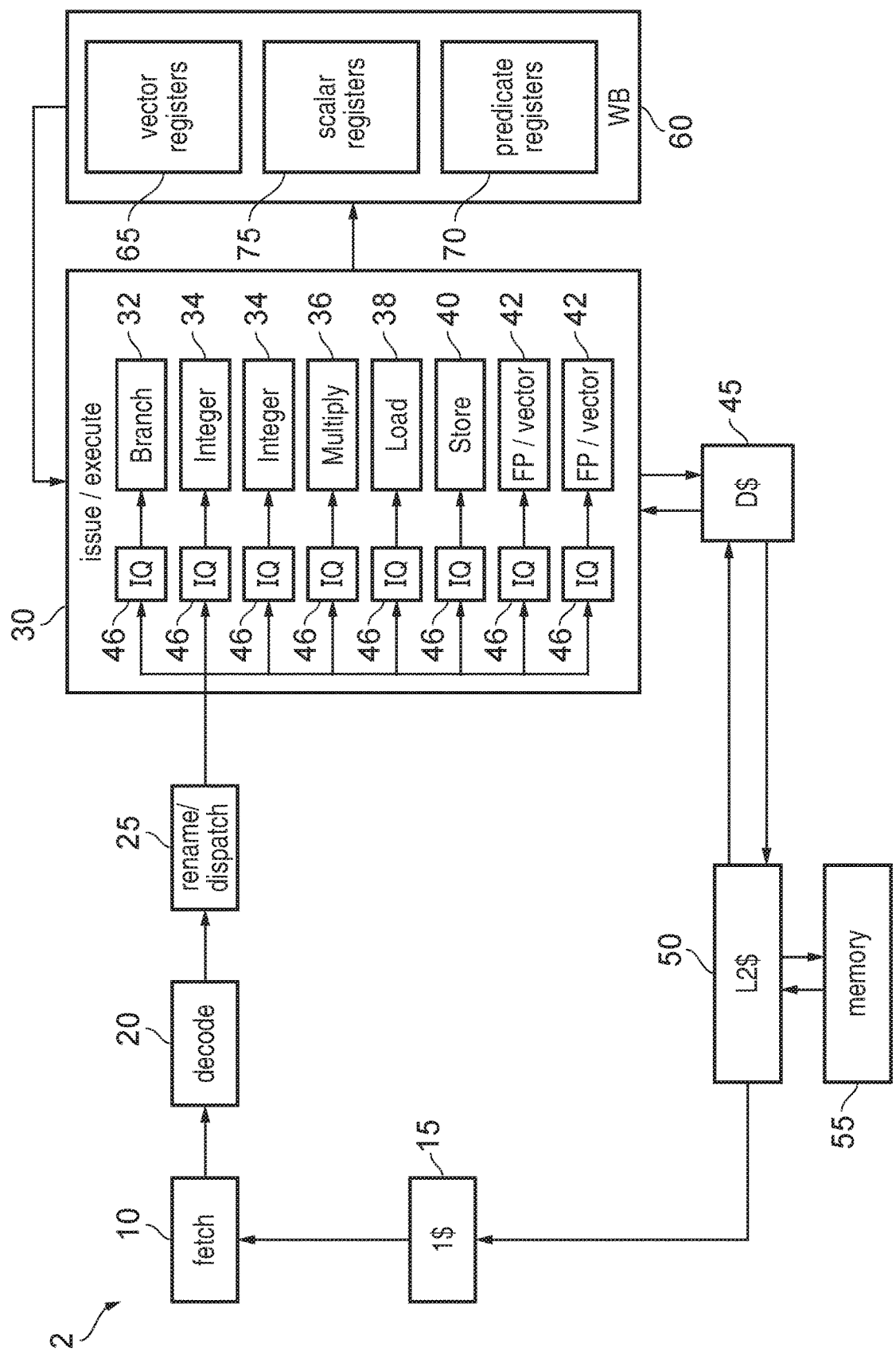

The onset of smarter and potentially semi-autonomous vehicles (cars, drones, etc.) represents a growing market for high performance processors. However, safety-critical systems require components to be certified to meet specific integrity levels. For instance the Automotive Safety Integrity Level (ASIL) risk classification scheme provides several levels of classification which vary in terms of the percentage of faults that can be detected. Processors focused on functional safety may be designed to include error detection mechanisms such as online logic built-in self-test, dedicated hardware checkers, etc., which can enable them to be classified at the highest classification level (ASIL D). However, application processors are more focused on performance within a general purpose environment and are less likely to support this degree of added complexity, as the cost and effort of including the error detection mechanisms would be infeasible for more complex higher-performance cores. However, if such a higher performance processor could be certified at a lower safety classification (e.g. ASIL B), then such processors could be combined with a smaller real-time processor for arbitration, to form a system complying with ASIL D, to enable higher performance in a safety-critical environment. Hence, it would be desirable to provide a technique for error detection which enables a higher performance processor to be classified for functional safety. In the lower levels of the classification scheme, it is not required for all potential faults to be detected (e.g. ASIL B requires at least 90% of single point faults and 60% of latent faults to be covered by the error detection scheme). Hence, the lower safety classifications give some freedom to trade off error correction coverage against performance and circuit area or power consumption overhead.

One approach for ensuring functional safety can be to use lockstep computation, where multiple redundant processors are provided, the same code is executed on each of the redundant processors, and outputs of the processors are compared to detect errors. A dual-core scheme with two redundant processors may permit error detection, while a triple-core scheme with three redundant processors may permit both error detection and error correction (since if an error is detected on one processor the correct value can be restored from the outputs of the other two processors). While a lockstep approach can achieve high performance at low development cost, since an existing high-performance processor design can be used for each of the redundant processors without modification, the circuit implementation cost is high because the total area and power consumption of the system is doubled or tripled compared to a single core. Also, as many interfaces on the respective cores may need to be compared to detect errors, a significant amount of additional wiring may be required.

An alternative would be to provide a "virtual lockstep" approach, where a single processor is provided and the same computation is repeated two or more times by time-division multiplexing. For example, a main thread and a checking thread may both be executed on the same processor and their outputs compared to identify errors. However, with this approach, the performance achieved for the main processing is effectively halved since each computation needs to be performed twice sequentially. Also, there is a problem that permanent faults caused by defects in the processor hardware (e.g. short circuits or broken connections) would not be detectable by the virtual lockstep scheme, because the same hardware unit would be used for both the main computation and checking computations, and so both the main and checking computations would be subject to the same error.

The inventors realised that some processors (typically those designed for higher performance) provide vector processing circuitry which supports processing of vector instructions for which a source operand or a result value of the instruction is a vector comprising multiple data elements. In some hardware implementations of the vector processing circuitry, hardware functional units may be provided for executing multiple lanes of processing on respective data elements of the vector in parallel, to improve performance, but even if the lanes are processed sequentially by a single hardware unit, by supporting the processing of a number of distinct data elements in response to a single instruction, code density can be improved and the overhead of fetching and decoding of instructions reduced, which can help improve performance.

Hence, many processor designs may already have vector processing circuitry for performing multiple lanes of processing on vector operands comprising multiple data elements. The inventors realised the vector processing circuitry can often provide some redundancy, since often the same functionality may be supported both by scalar processing circuitry for processing scalar instructions, and by the vector processing circuitry in response to vector instructions, and also there may be redundancy within the vector processing circuitry itself since multiple identical hardware units may be provided for processing the different lanes within a vector. Also, vector processing circuitry may often already support mechanisms (such as predication) for selecting which elements of the vector are required to be processed in response to a given instruction. These features can be exploited for error detection purposes.

Hence, when main processing is executed on the scalar processing circuitry or on a subset of lanes of the vector processing circuitry, at least one lane of processing on the vector processing circuitry may be used for executing checker processing for checking the outcome of at least part of the main processing, with the outcomes of the main processing and checker processing being compared to detect errors. Hence, unlike the dual-core or triple-core lockstep approach, this approach has a much lower circuit implementation cost, and is suited to higher performance processor designs with a larger physical size, as it can reuse circuitry already available within the processor for error detection purposes (intra-core lockstep), rather than requiring physical duplication of the entire processor (inter-core lockstep). Nevertheless, the approach also allows for improved performance and improved error detection coverage compared to the virtual lockstep approach. Hence, using a vector lane for error checking of main processing can enable more complex processors to be certified for at least the lower levels of functional safety classification, while providing improved performance or reduced hardware complexity for a given level of error detection coverage compared to the techniques discussed above.

Note that the hardware implementation of the vector processing circuitry may vary from embodiment to embodiment. While an instruction set architecture (ISA) may define the functional behaviour which is to be satisfied for a defined set of vector instructions, there may be some design freedom in how to implement this in hardware circuits. For example, some implementations may execute each lane of vector processing in parallel, others may execute each lane sequentially one by one on a common hardware unit, while other implementations may use an intermediate approach where groups of lanes are executed in parallel using a given set of hardware functional units, but multiple passes are required to execute a larger number of lanes corresponding to one vector instruction. Also, some implementations may share some circuitry between the scalar processing circuitry and the vector processing circuitry (e.g. although separate scalar and vector arithmetic units may be provided for integer computations, to save circuit area scalar floating-point instructions may reuse the same hardware units as floating-point vector instructions). Hence, it is not essential for the scalar and vector processing circuitry to be entirely separate. In general, the scalar processing circuitry refers to the collection of circuit elements used in processing scalar instructions, while the vector processing circuitry refers to the collection of circuit elements used in processing vector instructions, which could overlap to some extent.

Hence, in some embodiments it is possible that, for at least some instructions, the checker processing could be executed on the same hardware functional unit as the main processing. This would still allow temporary faults (such as bit flips caused by particle strikes) to be detected. If detection of permanent faults is required to satisfy the safety classification, then other techniques, such as providing software test suites, can be used in conjunction with the running of the checker processing on the vector processing circuitry, to provide the required error coverage. Even if the checker processing on the vector processing circuitry cannot detect all types of errors, it can still protect at least some elements of the processor from errors, and those elements could then be excluded from software testing, reducing the time spent executing the software checks in a test mode, and hence improving the performance of the system.

Nevertheless, in other cases the checker processing may be executed on a different hardware functional unit to the main processing. In practice, many processors supporting vector processing may already have multiple hardware functional units corresponding to different vector lanes, or may already provide separate scalar and vector functional units, but even it this is not the case, other embodiments may use a modified processor design where a few additional hardware functional units (requiring less additional circuitry than if the entire processor was duplicated) are provided for use in the error checking. By using different hardware functional units for the main and checker processing, this improves error coverage (since permanent hardware faults can be detected, not just temporary faults) and also improves performance as it allows the checker processing to be performed at least partially in parallel with the main processing. Also, unlike the virtual lockstep approach discussed above, performance and error coverage would not be limited by the need to reuse the same hardware for the main and checking computations.

Similarly, to improve error detection coverage, it can be useful for operands or status information for the main processing to be stored in a different part of hardware register storage to operands or status information used for the checker processing (e.g. the status information could include a program counter, status flags used for controlling conditional operations, processor mode information, etc.). By using separate register storage, this allows bit flips in the register storage to be detected, since an error in the hardware register used by one of the main processing and checker processing would not affect the other.

It is not essential for all operations of the main processing to be checked using the checker processing. Some types of instructions may not need to be checked in order to ensure functional safety. Also, as discussed below, some types of instructions may not be supported by the vector processing circuitry, so such instructions could be checked using a different (e.g. software-based) error detection technique. Also, a single check may cover multiple instructions. Hence, it will be appreciated that any references below to "checking the outcome of the main processing", or to comparing the outcomes of the main processing and checker processing, do not imply that every operation of the main processing needs to be checked using the checker processing on the vector processing circuitry.

The comparison of the outcomes of the main processing and the outcome of the checker processing could be performed at any time during the respective processing streams. For example, comparisons could be triggered at periodic or irregular intervals, e.g. on certain register writes or at more arbitrary points in the processing. In general, the more frequent the outcomes of the main processing and checker processing are compared, the lower the error signalling latency (delay between the error occurring and the error being flagged or acted upon), but more frequent comparisons may impact on performance.

In one example, the comparison of the outcomes of the main processing and checker processing may be triggered on performing a store operation for storing data resulting from the main processing to a data store (e.g. a cache or memory). By comparing the outcomes for detecting errors on each store operation, this can prevent errors in the operation of the processor leaking out of the processor into the memory system, which could potentially lead to errors in other devices accessing the same memory system, but this avoids the overhead of comparing values more frequently on each register write. In some implementations, explicit comparison instructions (separate from the store instruction triggering the store operation itself) may be included near the store instruction in the stream of instructions executed by the data processing apparatus for controlling the relevant comparison operations. Alternatively, other implementations may have hardware which triggers the comparison of the main and checker processing in response to the store instruction itself, which can reduce the number of instructions required to be executed and hence improve performance.

To set up the operand values required for the checker processing to mirror those used for the main processing, on performing a load operation of the main scalar processing for loading data from a data store to a scalar register file, or a load operation of the main vector processing for loading data from the data store to a part of a vector register file corresponding to the subset of the plurality of lanes used for the main vector processing, the loaded data may also be loaded to a part of the vector register file corresponding to at least one lane used for the checker processing. The mirrored load may be triggered by a separate instruction included alongside the existing load in the instruction stream, or may be performed automatically in hardware in response to a load instruction in the main processing stream. Similarly, move operations in the main processing (for moving data from one register to another) can also be mirrored in the part of the vector register file used by the checker processing.

In some cases, the same registers in the vector register file could be used for both main vector processing and checker processing. For example, in an implementation where vector instructions are predicated (with a control mask specifying which elements of the destination register should be updated in response to the vector instruction), then the predicates can be set to avoid interference between the checker processing in one lane of a vector register and main vector processing being performed in other lanes, so that the vector registers can be shared and the checker processing does not have a significant impact on the number of vector registers available for use by regular processing.

However, some systems may not support predication at all, or predication may not be supported for all vector instructions. In this case, executing some additional vector instructions with at least one lane providing checker processing to mirror scalar processing could result in changes to other lanes of the vector register, which could affect the outcome of other vector instructions being executed for purposes other than error detection if they use the same registers. This can be prevented by reserving at least one vector register of the vector register file for use by said checker processing. Such reservation could be done either in software (e.g. the compiler generating the code to be executed may prevent certain architectural vector registers being used for any vector instruction other than the instructions providing the checker processing), or in hardware, with certain hardware registers being dedicated for the checker processing that are not accessible in response to regular vector instructions (e.g. an instruction decoder could generate the instructions for the checker processing specifying a reserved hardware register which is not accessible to regular vector instructions, or a register renaming stage could ensure that the vector instructions for the checker processing have their register accesses mapped to a reserved hardware register).

In some cases, one or more lanes of the vector processing circuitry may be reserved as "checker lanes" for performing the checker processing, which cannot be used for regular vector instructions. The reserved lanes could be fixed permanently in hardware, or could be variable using predicate masks. If the main processing is scalar processing, then one lane of the vector processing circuitry could be reserved as a scalar checker lane (e.g. the least significant lane, or most significant lane). If the main processing is vector processing, then multiple lanes could be reserved as checker lanes, corresponding to multiple lanes of the main vector processing. In some cases, lanes may be reserved for both checking of scalar and vector processing, e.g. if there are N lanes available in total, 1 lane can be reserved for checking of the main scalar processing, and up to (N/2−1) lanes (rounded up to the nearest integer if N/2 is not an integer) reserved for checker processing corresponding to the main vector processing which may be performed using (N/2−1) of the other lanes.

To prevent interference between checker lanes and the lanes used for main vector processing, instructions for controlling the vector processing circuitry to perform the checker processing or to perform main vector processing may be associated with predicate information for controlling the vector processing circuitry to mask an outcome of certain lanes. In particular, where a lane is reserved as a scalar checker lane for performing the checker processing corresponding to the main scalar processing, instructions for controlling the vector processing circuitry to perform the checker processing corresponding to the main scalar processing may be associated with predicate information for controlling the vector processing circuitry to mask an outcome of said plurality of lanes other than the checker lane, and instructions for controlling the vector processing circuitry to perform the main vector processing or the checker processing corresponding to the main vector processing may be associated with predicate information for controlling the vector processing circuitry to mask an outcome of at least the scalar checker lane. For certain instructions (e.g. cross-lane vector operations), the instructions for vector processing circuitry or the checker processing corresponding to the main vector processing could also mask out the lanes used for the other of the main vector processing or checker processing corresponding to the main vector processing.

The checker processing using the vector processing circuitry, and the comparison of the outputs of the main and checker processing, can be triggered in software or in hardware.

Hence, in a software-implemented embodiment, the underlying hardware may be exactly the same as an existing processor design, but the sequence of instructions provided for decoding and execution by the processor may be different to the sequence of instructions provided if only the main processing was being executed. Hence, the instruction decoder in the processor may decode a sequence of instructions including instructions for controlling the data processing apparatus to perform the main processing, the checker processing and the error detection. For example, a compiler may generate the sequence of instructions to be decoded/executed by the processor based on code provided by a programmer or other compiler which does not include any instructions for performing the checker processing or comparison steps, so that the programmer writing the original code need not be aware that the error checking will be performed.

With a software-implemented embodiment, the instructions for triggering the checker processing may appear to be regular vector instructions, which may not be distinguished from the vector instructions used in main vector processing. In this case, it is possible that some processor implementations might execute some parts of the checker processing on the same hardware unit as the main vector processing or scalar processing that is being checked. This can be avoided by specifying annotation information with at least one instruction of the sequence instructions, to indicate that the checker processing is to be performed on a different hardware functional unit to the main processing. A given processor implementation may then be responsive to such annotation information to try to schedule the checker processing on a different hardware functional unit to the main processing, if possible, to allow for detection of permanent hardware faults.

Alternatively, a degree of hardware modification may be provided to assist with the error checking.

For example, in some cases the instruction set architecture (ISA) may include one or more dedicated instructions to help support the techniques discussed above. For example, an instruction decoder of the processing apparatus may be responsive to a scalar-vector comparison instruction, to control the data processing apparatus to perform the comparison of the outcome of the main processing and the outcome of the checker processing (when the main processing is the main scalar processing). For example, the scalar-vector comparison instruction may specify a given scalar register, and may trigger a comparison of a value in the given scalar register with a value in a data element of a vector register used by the checker processing. In another version of the scalar-vector comparison instruction, the comparison may compare one or more scalar status flags set in response to the main scalar processing with one or more vector status flags set in response to the checker processing. In some cases, the instruction may simply set a result value or status flag in dependence on the comparison result. However, other implementations may also combine the comparison with a conditional branch operation, so that in response to the scalar-vector comparison instruction, the instruction decoder also controls the data processing apparatus to conditionally branch to a target instruction address in dependence on the outcome of said comparison. This can be useful for directing program flow to a routine for handling detected errors if a mismatch is detected between the outcomes of the main and checker processing.

Such instructions, which directly control a comparison of scalar architectural state with vector architectural state, would be seen as extremely counter-intuitive by a skilled person, because direct interaction between the scalar and vector register files is typically not practical as the scalar and vector register files are often far apart on the physical layout of the processing design and so the relatively long wiring used for routing the values to be compared to a comparator would typically be incompatible with timing requirements imposed by the frequencies with which a relatively high-performance processor is expected to operate. Instead, interaction between the scalar and vector register files would typically be limited to instructions which merely copy a value from one of the scalar/vector register files to the other, rather than performing any additional operation using those values. However, the inventors recognised that, unlike during regular processing, when the comparison is being performed for error checking, the operation is not time critical as it is not on the critical path of the main processing. Hence, it is not necessary for the comparison operation to fit within the normal timing constraints imposed on regular computation operations. Also, in the example where the instruction also triggers a conditional branch operation, while one might expect a general comparison between scalar and vector register files to be difficult to predict using normal branch prediction mechanisms, when a dedicated type of branch instruction is provided specifically for use in the error checking, the branch can be predicted with very high accuracy (always assuming that there is no error), since the cases when errors occur will be rare in comparison to the normal case when the checking processing matches the main processing. Also, when a specific vector lane is reserved as a scalar checking lane, the scalar-vector comparison instruction can be relatively efficient to implement in hardware, as there is no need to provide a multiplexer for selecting arbitrary elements from the vector register—instead the comparison may always receive the value from a certain fixed lane.

In summary, providing ISA support for a scalar-vector comparison instruction enables one instruction to trigger the required comparison operation (as opposed to several instructions for transferring values between the scalar/vector register files, comparing the outcomes, and conditionally branching depending on the comparison result), and such an instruction is not as complex to implement in hardware as one might expect.

Other examples may have further hardware support for automatically controlling the checking and comparison operations, without requiring explicit instructions to be provided for this in the stream of instructions fetched from memory for decoding/execution. Hence, in some cases the data processing apparatus may comprise control circuitry to control the vector processing circuitry to perform the checker processing using at least one lane of the plurality of lanes provided by the vector processing, and error detection circuitry to perform error detection in dependence on a comparison of an outcome of the main processing and an outcome of the checker processing. For example, the control circuitry could be the instruction decoder, which may generate instructions for controlling the checker processing. The error detection circuitry could be dedicated hardware for automatically comparing the outcomes of the main and checker processing in response to store instructions or other instructions within the main processing stream, or alternatively could be an existing comparator or arithmetic circuit within the scalar or vector processing circuitry, which could be controlled by a compare instruction (either a conventional compare or one of the scalar-vector compare instructions described above) to compare values derived from the main and checker processing circuitry.

In some cases, all processing performed by the data processing apparatus may be checked using the checker processing on the vector processing circuitry, while other examples may only perform checker processing corresponding to certain parts of the main processing.

In one example, the data processing apparatus may have a number of modes of operation including a first mode in which the checker processing is executed in addition to said main processing, and a second mode in which execution of the checker processing is suppressed. For example a mode bit in a configuration register could be used to set the current mode of operation. Any hardware assisted functions supporting the error checking (such as automatically mirroring loads in the main processing to the parts of the register file used by the checking processing, or automatically comparing the main/checker processing on a store in the main processing) can be disabled in the second mode but enabled in the first mode. This approach can be useful for reducing the energy and performance overhead for non-lockstep use cases. For example, in the second mode the full vector width can be used by main vector processing as there is no need to reserve any lanes or vector registers for checking purposes—hence the number of lanes of vector processing available for use in the main vector processing in the first mode may be less than the number of lanes of vector processing available for use in vector processing performed in the second mode. Similarly, in some embodiments the number of vector registers which are available for the main processing may be less in the first mode than in the second mode.

In one example, the data processing apparatus may have an instruction decoder which maps a first sequence of instructions comprising instructions defining the main processing to a second sequence of instructions comprising instructions defining the main processing and the checker processing, and to control the data processing apparatus to perform data processing based on the second sequence of instructions. Hence, in this case the software tool chain (e.g. compiler) which generates the code to be executed by the processor does not need to be aware of the error checking functionality, as the instruction decoder within the processor itself can automatically generate the required instructions for controlling the downstream processing circuitry to perform the checking processing. Similarly, the decoder may also generate instructions for controlling the data processing apparatus to perform the comparison of the outcome of the main processing and the outcome of the checker processing (if this is not already controlled automatically in hardware).

For example, the instruction decoder may map a scalar instruction of the first sequence of instructions to a scalar instruction and a checker vector instruction of the second sequence of instructions. Hence, scalar instructions are effectively decoded twice, once to generate the instruction for controlling the main scalar processing, and once for generating the checker vector instruction for controlling the checker processing on the vector processing circuitry. The checker vector instruction generated by the decoder may be associated with predicate information for masking lanes other than the scalar checking lane, or alternatively this predicate information may be implicit in some embodiments.

In some cases, the vector processing circuitry may not support all the functionality available to scalar instructions. If the instruction decoder encounters a scalar instruction in the first sequence of instructions which corresponds to an operation unsupported by the vector processing circuitry in response to a single vector instruction, this can be handled either by:

triggering an exception condition (e.g. signalling an undefined instruction, which could then be handled using a software exception handler which may provide error checking functionality), or by mapping the scalar instruction to two or more vector instructions of the second sequence of instructions for performing a combined operation corresponding to the operation of the scalar instruction, which may have reduced performance but still permits detection of permanent hardware faults, or by mapping the scalar instruction to two scalar instructions which can be executed back to back on the scalar processing circuitry. For example, the scalar instruction can simply be executed twice, which would at least permit detection of temporary hardware faults, as well as some permanent faults if there are two or more functional units of the same type and either hardware support or ISA hints are provided to ensure that the two scalar instructions are issued to separate functional units.

Which approach is taken may be selected depending on implementation needs and the desired error detection coverage sought for a given level of safety classification.

On the other hand, when encountering a vector instruction in the first sequence of instructions, the instruction decoder may map the vector instruction to one of: a single vector instruction of the second sequence of instructions for which a first subset of lanes correspond to the main vector processing and a second subset of lanes correspond to the checker processing; or to a first vector instruction corresponding to the main vector processing and a second vector instruction corresponding to the checker processing. Whether the checker processing can be executed within the same instruction as the main vector processing may depend on the type of instruction. For example, while it may be safe to execute in-lane arithmetic instructions without any cross-lane dependencies with the main and checker processing in different subsets of lanes within the same instruction, for instructions such as permute instructions where an element at a given position in the result vector depends on elements at other positions in the source vector, executing the checker processing in the same instruction as the corresponding main processing could cause interference between independent operations, and so in this case it can be preferable to split the instruction into two separate vector instructions, one for controlling the main vector processing and another for controlling the checker processing.

In some cases, the vector processing circuitry may have at least one hardware functional unit providing functionality required for a scalar instruction which is not required for any vector instruction of an instruction set architecture supported by the data processing apparatus, and the checker processing may be executed using the at least one hardware functional unit. For example, although a certain operation may not normally be supported in the vector processing, expanding at least one hardware functional unit to support that operation can be useful for reducing the number of scalar instructions which do not have a vector equivalent.

Some specific examples are discussed below. It will be appreciated that the invention is not limited to these particular examples.

FIG. 1 is a block diagram of a data processing apparatus 2 in which the techniques of the described embodiments may be employed. In the example shown in FIG. 1, the apparatus 2 takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry (instruction decoder) 20 which decodes each instruction in order to produce appropriate control signals for controlling downstream execution resources within the pipelined processor to perform the operations required by the instructions. The control signals forming the decoded instructions are passed to register renaming and dispatch circuitry 25. The register renaming/dispatch circuitry 25 maps the architectural registers specified by the instructions to physical registers from a pool of physical registers 65, 70, 75 (the pool of physical registers typically being larger than the number of architectural registers), thereby enabling certain hazards to be removed, facilitating more use of out of order processing. The register renaming/dispatch circuitry 25 also dispatches the renamed instructions to the issue/execute stage 30 of the pipeline.

The issue/execute stage 30 comprises a number of execution pipelines 32, 34, 36, 38, 40, 42 for executing different types of instructions. The execution pipelines 32-42 may collectively be considered to form processing circuitry. While FIG. 1 shows an example where the issue stage is split into a number of smaller issue queues 46, with each execution pipeline 32-42 associated with a corresponding issue queue 46 for queueing instructions to be processed by that pipeline 32-42, other examples could have a combined issue queue 46 shared between more than one execution pipeline 32-42.

Instructions remain in the relevant issue queue 46 until the operands required for that instruction are available in the registers. In particular, source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations. The registers can also include registers for storing control information or status information, such as a program counter indicating a current point of execution of the program, condition status flags for controlling the operation of conditional instructions, processor mode bits, etc.

When the required operands for a given instruction in the issue queue 46 are available and the corresponding functional unit is ready, the instruction is issued to the relevant execution pipeline. In this example, the execution pipelines 32-42 include a branch instruction pipeline 32 for executing branch instructions, two integer pipelines 34 for executing scalar integer arithmetic instructions other than multiply or multiply-accumulate operations (e.g. add, subtract). A separate multiply pipeline 36 is also provided for handling multiply or multiply-accumulate operations (other examples could combine the integer and multiply pipelines 34, 36 into a single unit). A load pipeline 38 is provided for executing load operations for loading a given scalar register 75 or vector register 65 with data read from the memory system (via a data cache 45 and any intervening further levels of cache such as a level 2 cache 50), and a store pipeline 40 is provided for handling store operations for storing data from a given scalar/vector register 75, 65 to the memory system 45, 50, 55. Also, two floating-point (FP) and vector processing pipelines 42 are provided for handling scalar or vector floating-point operations and other non-floating point vector operations. In this example, the scalar floating-point instructions are executed within the vector processing pipelines 42 to avoid duplication of the floating-point circuitry, but it would also be possible to provide a separate scalar floating-point unit. Hence, the pipelines 32-42 may all be seen as scalar processing circuitry supporting execution of scalar processing, while pipelines 38, 40, 42 may be seen as vector processing circuitry supporting processing of vector instructions using two or more lanes of processing performed on vector operands (the load/store pipelines 38, 40 may handle vector load/stores). The results of the executed instructions are written back to the registers 65, 70, 75 at a writeback stage 60 of the pipeline. It will be appreciated that the set of execution pipelines 32-42 shown in FIG. 1 is just one example, and other embodiments may have a different numbers or types of execution pipelines.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided for supporting out-of-order execution (e.g. a reorder buffer may typically be provided to keep track of the out of order execution, and to allow the results of the execution of the various instructions to be committed in order). In an in-order implementation, the rename stage 25 may not be required.

Current and upcoming application processors include increasingly wide Single Instruction Multiple Data (SIMD) datapaths and more powerful vector execution units. A range of vector instructions may be supported capable of emulating the behaviour of the vast majority of scalar instructions. In addition, predicate registers allow many instructions to selectively enable or disable individual vector lanes. As shown in FIG. 2, a set of hardware mechanisms and/or compiler-generated instructions can be provided to repurpose one or more vector processing lanes to run in lockstep with scalar functional units, and to replicate the contents of scalar registers within the vector register file. This allows checker processing to be executed on at least one lane of the vector processing circuitry 42 for checking the outcome of main processing performed either on the scalar processing circuitry 32-42 or on other lanes of the vector processing circuitry 42.

For ease of explanation, we shall first describe an example where the main processing is scalar processing (other examples where the main processing is vector processing are discussed later). A number of potential implementation variants are given below, but FIG. 2 shows the basic concept:
  A. Scalar loads and move operations are mirrored to a specific lane in the equivalent vector register, e.g.
     load <foo> into x0→move <foo> into v0[n]
     load <foo> into x1→move <foo> into v1[n]
     (where n is the index of the register element corresponding to the vector lane reserved for intra core lockstep)
  B. Scalar operations are mirrored with equivalent vector operations (on lane n). For example, when a scalar add instruction for adding the contents of registers $X_A$ and $X_B$ is performed in the main processing, this is mirrored using a vector add instruction which performs a similar addition on lane n of vector registers $vSrc_A$ and $vSrc_B$. As shown in FIG. 2, lanes other than the lane used for the checker processing can be masked by using a predicate ($P_{lockstep}$).
  C. On a scalar store operation, the value in the target register for the store operation is compared with an equivalent vector register element in the vector register file 65, and if a mismatch is detected then a fault is signalled, e.g. by branching to a location of handler code if the comparison gives a not equal result, and the handler then signalling the error to other devices or taking steps to address the error (e.g. by triggering a reset to a previous point of execution). Further comparisons may be performed on processor internal values (e.g. flags) to increase coverage.

Figure 3:
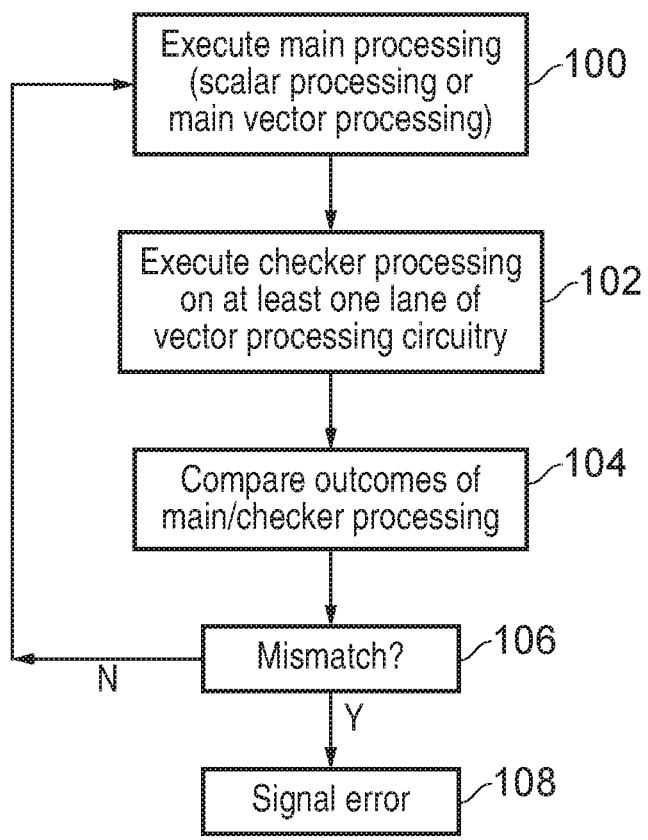
FIG. 3 shows a method of checking errors in main processing using at least one lane of vector processing circuitry.

FIG. 3 shows a flow diagram illustrating such a method. At step 100, main processing is executed, which could be scalar processing on the scalar processing circuitry 32-42 or vector processing on a subset of lanes of the vector processing circuitry 42. At step 102 checker processing is executed on at least one lane of the vector processing circuitry 42 (either in parallel with the main processing or sequentially). At step 104 outcomes of the main and checker processing are compared, and if a mismatch is detected at step 106, then an error is signalled at step 108, while otherwise the method returns to step 100 to continue with the main processing and checker processing.

Referring to FIG. 1, while the functionality within the integer 34 and multiply 36 pipelines may be replicated within the vector data path 42, other units such as the branch pipeline 32 or load/store pipelines 38, 40 are unlikely to be replicated for a vector data path. Hence, the intra-core lockstep scheme may not be able to detect permanent faults within those components (errors in these components could be detected by other techniques such as using software testing). Similarly, in cases where the same functional unit (FU) is shared for scalar and vector computations (e.g. the floating-point unit in the example of FIG. 1), then shared functional units would not be able to detect permanent faults within them based on the proposed schemes, so again some other testing technique could be used for these. Nevertheless, the mirroring of scalar operations on the vector processing unit still reduces the number of elements which need to be tested by other means, to help improve performance.

Note that the vector functional units (FUs) 42 may be slower than corresponding scalar FUs 34, 36 even when executing substantially the same operation. This could be partially offset by favouring scalar operations for lockstep integration, e.g. move lockstep value into scalar register and use scalar compare instead of vector-register based version show in FIG. 5 below. Also, assuming the absence of direct dependencies, some long latency vector instructions may be overlapped with multiple scalar instructions. Also, processors may include multiple scalar FUs of the same type (e.g. two Integer FUs 34 in FIG. 1). In some cases, it may be possible to offset this by providing multiple narrow FUs rather than one wide FU, e.g. two units operating on two elements in parallel rather than one unit operating on 4 elements, so that vector operations on a small number of lanes (e.g. only one for the proposed scheme) could be parallelised.

Three implementation variants are discussed below, which are ordered based on the level of hardware support required.

Purely Compiler Driven

This approach has the advantage that there is no hardware overhead or opcode overhead in the ISA, as an existing processor design can be used without any modification at all. Instead, the control of the checking operations for intra-core lockstep is performed in the software toolchain, with recompilation of the code to be executed to include additional instructions for performing the checker processing and the comparisons. Also, an operating system exception handler may be provided to deal with faults raised by the error checking.

Figure 4:
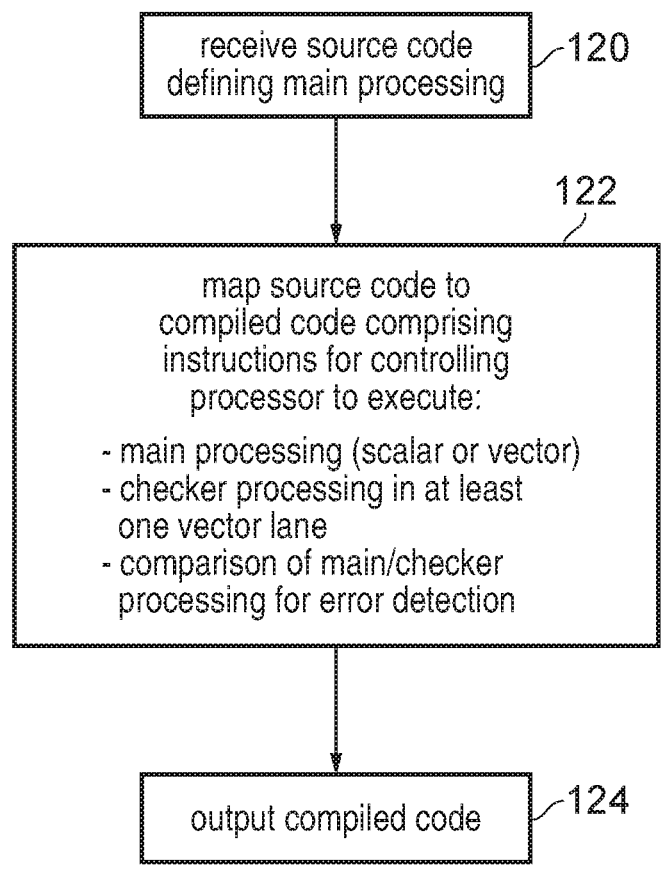
FIG. 4 shows a method of generating compiled code including instructions for triggering the main processing and checker processing and for comparing outcomes of the main processing and checker processing.

FIG. 4 shows a flow diagram illustrating a method of compiling code for an apparatus 2 having scalar and vector processing circuitry. At step 120 source code providing a first sequence of instructions defining the main processing is received by the compiler. The source code could be high-level code written by a programmer, or could be compiled code in assembly language which was earlier compiled from high-level code from the programmer. At step 122, the source code is mapped to a second sequence of instructions (compiled code), which includes at least instructions for controlling the processing apparatus 2 to execute the main processing (scalar or vector), the checking processing in at least one lane of the vector processing, and one or more comparisons for comparing outcomes of the main and checker processing for error detection. At step 124 the compiled code is output, and the compiled code can then be stored in the memory 55 of the processing apparatus 2, so that when the compiled code is fetched and decoded, the processing apparatus 2 will perform the method as shown in FIG. 3.

For example, FIG. 5 illustrates how the assembly code corresponding to a basic C code example may be annotated to verify the computation result of "total" before it is written back to memory. Note that the loop counter "i" is not checked as part of each loop iteration. As it affects the value of "total", it is implicitly checked before "total" (R0) is stored back to memory. The compiler introduces additional vector move instructions (vDUP) for mirroring the scalar move instructions (MOV) in the assembly code, additional vector arithmetic instructions (vADD, vSUB) corresponding to the scalar arithmetic instructions ADD, SUBS of the assembly code, and some instructions vDUP, vCMP, BNE at the end of the loop for copying the scalar result R0 to the vector register file and comparing it with the outcome of the checker processing in vector register V0, and branching to a handler if a mismatch is detected. If no mismatch is detected, the scalar store operation (STR) is allowed to proceed. While this approach increases performance for the common case (no fault), it does not allow the detection of endless loops. This may be acceptable, as such a loop would not corrupt architectural state while running and the corresponding (faulty) thread could be terminated by other means (e.g. using a watchdog timer). The main advantage of a purely compiler driven approach is the ability to operate on unmodified hardware. However, not all scalar instructions have a vector equivalent, so this approach may restrict the set of scalar instructions available to the compiler, or alternatively multiple vector micro-operations may be used to emulate one scalar instruction (this may require additional (temporary) vector registers). Also, comparisons introduced by the lockstep mechanism may pollute status flags (e.g. condition flags set for allowing evaluation of conditions for resolving conditional instruction, which in some embodiments may be shared between the scalar and vector processing circuits). In this case, the compiler may need to be aware of the way the condition flags are implemented, to mitigate undesired effects.

Without ISA and hardware support to directly compare scalar registers to vector elements (as discussed in the variants below), a vector register (e.g. Vx in FIG. 5) can be reserved to temporarily hold a scalar value prior to comparison, or alternatively the lockstep element may be transferred into a scalar register for comparison. In either case, if a register has to be reserved for the comparison, this would not permit 1:1 matching between IDs of scalar and vector registers (i.e. R0 to V0[n], R1 to V1[n], . . . ), so there may be some increase in register pressure. This can be avoided in the ISA assisted and hardware supported embodiments discussed below.

With a purely compiler-implemented variant, unpredicated instructions used for lockstep operations can change (corrupt) data held in remaining vector elements in other lanes. As some ISAs may only provide predicates for a subset of instruction types, then to avoid cross-interference between the checking processing and regular vector operations, some registers may need to be reserved for the scalar checking operations, effectively limiting the number of vector registers available for use by the compiler for conventional vector code.

On the other hand, if vector instructions are predicated (allowing vector registers to be shared between conventional vector code and the checking operations), then the compiler may need to introduce additional instructions for managing the predicates for the respective vector instructions, as a vector register may now contain data for conventional vector elements, lockstep vector elements (for checking outcome of conventional vector processing) and a lockstep scalar element (for checking outcome of scalar processing). These additional instructions for setting the vector predicates may reduce performance compared to a non-lockstep case.

Detection of permanent faults in vector FUs requires conventional and lockstep instructions to be processed in different FUs (or in different FU lanes of the vector processing unit). Software may not be able to guarantee this, potentially reducing the error detection coverage of a purely compiler driven implementation variant. However, some processor designs may support annotation information which can be provided with selected instructions to force them to be executed on different FUs, so the compiler can use such annotation information to provide hints that the vector instructions for error checking should be scheduled on a different FU to the regular code.

With a purely compiler-driven embodiment, the special purpose registers (e.g. status flags, program counter) may be shared between the scalar and vector processing. Some errors in the special purpose registers may have a knock on effect in other operations, so that such errors can still be detected by the comparison between the main and checker processing. For example, in the case of the program counter (PC), the interleaving of corresponding scalar and vector instructions allows the detection of a subset of faults, e.g. a branch to an arbitrary location may "skip" a different number of scalar than vector instructions, and therefore cause a subsequent comparison to fail. However, for other types of errors that may not be detected by the comparison between the main and checker processing, orthogonal error detection techniques (e.g. using software testing) could be used to detect such errors.

ISA Assisted

Figure 6:
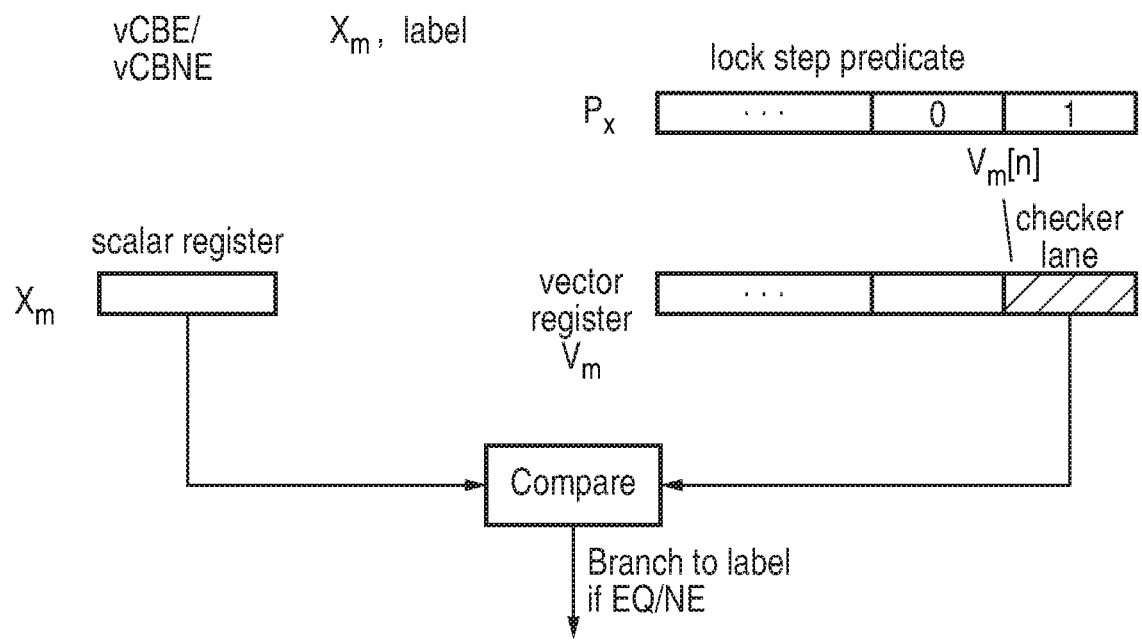
FIG. 6 shows an example of an instruction for comparing a scalar register with an element of a vector register and conditionally branching to a target address in dependence on the outcome of the comparison.

The compiler driven approach described above can be improved significantly by providing a small degree of ISA (Instruction Set Architecture) support for intra core lockstep. For instance an instruction can be provided to compare a scalar register with a vector element and branch on equal/not-equal (vCBE/vCBNE). FIG. 6 shows an example of this type of instruction. The instruction specifies $X_m$, identifying the scalar register used for the comparison, and an address "label", which identifies the branch target location to branch to if the equals or not equals condition is satisfied. The address "label" can be expressed as an offset relative to the program counter (the address of the current instruction). Whether the vCBE or the vCBNE version of the instruction is used can be selected depending on whether the error handling code is located sequentially to the code providing the main and checking processing (e.g. when vCBE can be used so that there is branch on equals (EQ) to the next piece of code to provide main/checking processing), or at a non-sequential location (e.g. when vCBNE can be used so that there is a branch on not equals (NE) to the error handler). Although the branch target address could be the actual address identifying the error handler or the next piece of main/checking processing to be executed, in practice there may be a limited number of bits available in the instruction encoding for identifying the address. If there are not enough bits available to encode the actual branch target address, a trampoline structure could be used, where the label encodes a short jump to a nearby unconditional branch instruction, and the unconditional branch instruction then branches to the actual target address. This approach helps to keep the opcode size small, and especially for the vCBNE version of the instruction, the slight reduction in performance by having to execute two instructions for the branch instead of one is generally acceptable as faults would be rare.

The other operands of the instruction can be implicit. If there is a 1:1 mapping between the scalar registers used for the main scalar processing and the vector registers used for the corresponding checking processing, then the identification of scalar register $X_m$ may also implicitly identify that the vector element to be compared with the scalar register $X_m$ is element n of the corresponding vector register $V_m$, where n is the scalar checking lane which can be determined by an implicit lockstep predicate value $P_x$ or be implicitly fixed in hardware. Alternatively, the vector register $V_m$ or the lockstep predicate $P_x$ could also be specified in the instruction encoding. Similarly, the instruction could use another register operand to indicate a register holding its branch target, rather than using a label.

When the vCBE or vCBNE instruction is fetched from the instruction cache 15, it is decoded by the instruction decoder 20, which controls the execute stage 30 to perform an operation as shown in FIG. 6, where the value in scalar register $X_m$ is compared with the value in element n of vector register $V_m$, and a conditional branch to the address indicated by "label" is performed in dependence on whether the result of the comparison was equals or not equal (with a branch occurring on EQ for vCBE or on NE for vCBNE).

An alternative version of these instructions could compare scalar and corresponding vector flags. The flags may be condition status flags indicating a property of a previous processing result, e.g. whether the result was negative, whether the result was zero (or equals for a comparison operation), whether the result generated a carry (unsigned overflow), or whether the result overflowed (for signed arithmetic). Conditional instructions may use the condition status flags to evaluate their condition and determine whether the associated operation should be performed. Hence, a difference in the status flags can indicate that there was a difference in the operations which generated the flags, so can signal an error in one of the main and checker processing. Hence, the flag comparing instruction may compare the outcome of the main/checker processing by comparing the scalar and vector specific flags generated by the main and checker processing, rather than the integer or floating-point values generated by the main and checker processing. This would have the advantage that there may be fewer operands required by the instruction (as both the scalar and vector flag registers can be implicit as they would always be the same register) and fewer interactions between scalar and vector registers (no need to multiplex data from arbitrarily selected register to the comparator). However, while such an instruction could detect errors in variables used to determine branch conditions (e.g. R1 in the FIG. 5 example), it may not cover errors in values to be written to memory (e.g. R0 in FIG. 5). Hence, some implementations may support both the data value comparing and flag comparing forms of the scalar-vector comparison instruction in order to support detection of both types of error.

Note that the ISA instruction examples above are by no means exhaustive and can be seen as orthogonal to each other. Alternative implementation variants may choose to separate the comparison of a scalar register and a vector register element from the subsequent conditional branch, i.e. to use a vCMP instruction, which compares a scalar register used by the main scalar processing with the element of the corresponding vector register used by the checking processing, followed by a conditional branch instruction BNE. This would reduce the opcode overhead introduced by avoiding the label operand. However, it would also potentially lower performance, due to an increased instruction count, the need to pollute scalar flags, and so on.

In summary, providing a native instruction in the ISA which can be decoded by the instruction decoder to control a direct comparison between a value in the scalar register file and a value in the checker lane of the vector register file can be very useful to improve performance of the intra-core lockstep checking using the vector processing circuitry 42. One would normally seek to avoid direct interactions between the scalar and vector register files for performance reasons, as the long wiring between the physically remote scalar and vector register files on a typical high-end processor would make the timing constraints difficult to meet at the frequencies generally required to be supported by such a processor. However, for the scalar-vector comparison instructions discussed above, this is not generally a problem, since they are not time critical, and in the combined comparison/branch versions of the instruction, the branch outcome can be predicted with very high accuracy (assume no fault since faults are rare). Also these instructions only require connections to a specific vector lane used for the scalar checking, so there is no need to multiplex an arbitrary element from a vector register, instead simply forward the predetermined "lockstep" element to a scalar comparator.

Such instructions provide a performance benefit for several reasons. Firstly, there is reduced pressure on vector register file, since there is no need to temporarily hold a result of an instruction for transferring a scalar value to the vector register file (e.g. the vDUP instruction in FIG. 5) or vice versa. Also, it performs the comparison and branch in one instruction instead of three instructions (vDUP, vCMP and BNE as in FIG. 5), so there is reduced pressure on internal queues (e.g. decode queue, issue queue 46), and improved code density reduces instruction cache 15 pollution. The instruction can be easily predicted by branch predictors with high accuracy (as faults should be rare), as the instruction type provides good hint to prediction logic (so potentially more reliable than a generic branch instruction). Also, the use of a special compare/branch instruction means that the comparison for lockstep checking does not pollute the scalar condition status flags, so there is more freedom for the compiler to optimize the order of instructions. The instructions can also provide potential energy savings, as there is a reduced number and scope of vector operations and increased performance.

Hardware Assisted

Other than providing ISA support for additional instructions as discussed above, a number of further hardware modifications can provide even greater performance for the lockstep checking. In some examples, the processing apparatus 2 may have a lockstep specific hardware mode, which can provide the most comprehensive error detection coverage and best performance of the proposed implementation variants. Depending on the specific implementation, it can be designed to provide intra core lockstep protection transparent to user level applications; i.e. without the need to recompile an existing code base. Its ISA footprint can be kept slim, e.g. one software readable status register bit indicating hardware support for the mode and an exception handler to trap into after a fault was detected. The trade-off regarding a high degree of hardware support is cost, not just in terms of area overhead and design time, but also in validation complexity. The following section describes examples for components that may be implemented as part of a lockstep mode.

Firstly, the processor may support a lockstep mode bit to distinguish lockstep from conventional operation, so that energy and performance overhead can be reduced for non-lockstep use cases while still supporting the lockstep processing as well. For example, a status register may provide the lockstep mode bit, which can be set to indicate that the processor should operate in lockstep mode or cleared to indicate that the processor should operate in non-lockstop mode. In non-lockstep mode, the instructions defining the main processing to be performed would be decoded as normal, without introducing additional instructions into the pipeline to trigger checker processing or the comparisons of the main and checker processing. The full vector width would be available for vector instructions (including all the lanes supported by the vector processing units 42).

On the other hand, in the lockstep mode, the instruction decoder 20 may be modified to inject additional instructions into the pipeline corresponding to the checker processing and comparison of the main and checker processing. For example, instructions can automatically be decoded twice. In the case of scalar main processing, a scalar instruction can automatically be decoded once as a scalar instruction and a second time as a corresponding vector instruction providing the checker processing. In the case of vector main processing, the vector instruction could be mapped either to a single vector instruction with a first subset of lanes providing the main processing and a second subset of lanes providing the checker processing, or to two separate vector instructions corresponding to the main and checker processing respectively.

Figure 8:
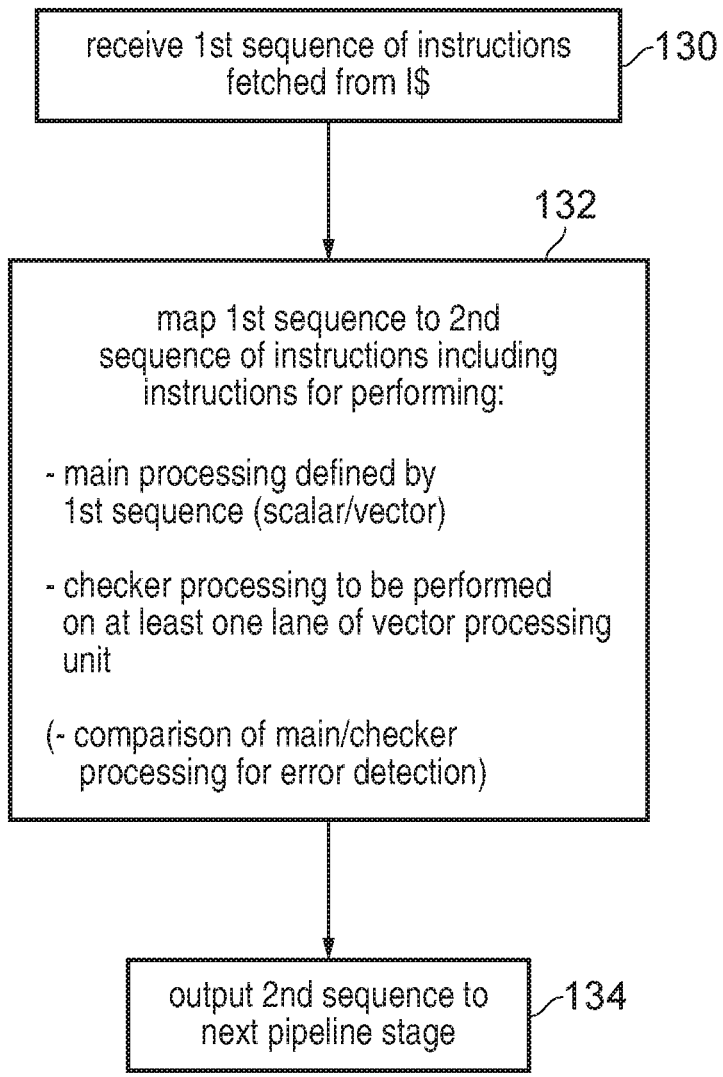
FIG. 8 shows a method for an instruction decoder to generate instructions for performing the checker processing.

FIG. 8 shows a method of decoding instructions in a hardware-assisted embodiment. At step 130, a first sequence of instructions is fetched from the instruction cache 15, comprising instructions for controlling the pipeline to perform the main processing (which could be either scalar or vector processing or a mixture of both). At step 132 the first sequence of instructions is mapped to a second sequence of instructions (also known as micro-operations, which represent the internal operations supported by the execute stage 30 as opposed to the macro-operations defined in the ISA) by the decoder 20. The second sequence of instructions includes instructions for performing the main processing defined by the first sequence, as well as checker processing providing corresponding operations to the main processing, with the checker processing executed on at least one lane of the vector processing unit 42. Note that in the case where the main processing is vector processing, the checker processing could be implemented using the same instructions as the main processing (with partitioned lanes), so it is not essential for separate instructions to be generated. Optionally, the second sequence of instructions may also include instructions for triggering a comparison of the main/checker processing (which could be generic compare instructions or the specific scalar-vector comparison instructions discussed above). On the other hand, if the hardware automatically triggers comparisons between the main and checking processing in response to store instructions then including such comparison instructions may not be required. At step 134, the second sequence of instructions is output to the next pipeline stage 25 and the instructions are processed by the remainder of the pipeline.

Also, the processor may have hardware for automatically transferring results of scalar loads to specific elements of a corresponding vector register. Similarly, scalar operands resulting from scalar processing may automatically be compared against the equivalent vector element prior to a scalar store operation, with a fault exception being raised on a mismatch. Both of these operations may be triggered automatically either by generating corresponding micro-operations in the instruction decoder 20, or by using dedicated forwarding paths between certain elements within the vector register file and certain scalar functional units such as the load/store pipelines 38, 42 or arithmetic units 34, 36.

Some scalar instructions may not have a vector equivalent. A compiler flag could be used to limit the available instructions used by the compiler when compiling code intended for use in the lockstep mode. Alternatively, if the instruction decoder 20 encounters an instruction not supported in lockstep mode, then the decoder 20 could either raise an exception (e.g. an undefined instruction exception), or re-execute the instruction twice in a scalar functional unit (read value from vector register file, execute in scalar FU, then write-back to vector register file, although this would not allow detection of permanent faults in scalar FUs (unless they could be reserved for lockstep execution)). Another option would be to map the unsupported scalar instruction to a combination of two or more vector instructions which achieve the same result. Certain instruction types (e.g. branches or memory barriers) could be ignored by the decoder for lockstep purposes since they are unlikely to have vector equivalents and they can be checked by other means (e.g. through software checking).

Figure 7:
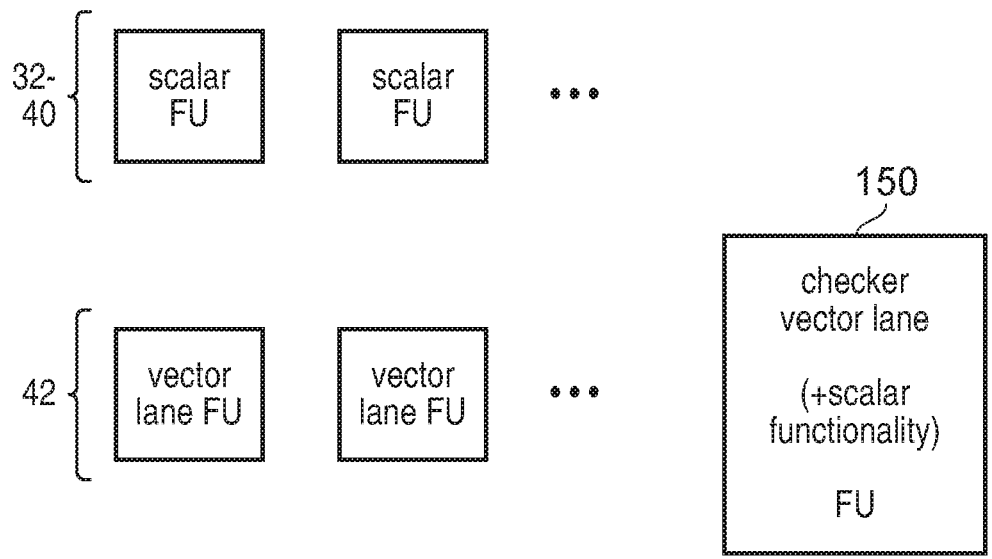
FIG. 7 shows an example where a lane of vector processing is reserved for the checker processing, and a hardware functional unit in the checker lane has expanded functionality compared to other lanes.

Another way in which the hardware may help support intra-core lockstep checking may be to expand the functionality of certain functional units within the execute stage 30. For example, as shown in FIG. 7, the execute stage may have a number of scalar hardware functional units (e.g. corresponding to execution pipelines 32-40) and a number of vector lane hardware functional units (part of the vector pipelines 42). The number of vector lane functional units need not be the same as the maximum number of supported vector lanes, as a larger number of vector lanes can be processed in several passes of the functional units. While generally each vector lane functional unit would normally be identical, to support lockstep checking in a dedicated checker vector lane, at least one vector hardware functional unit 150 may partially or fully replicate functionality of one or more scalar FUs for one vector lane. This is an optional feature, but if a checker vector lane with expanded functionality can be provided, this can increase number of supported instructions in lockstep mode, and so increase error detection coverage for permanent faults compared to the case where the decoder re-executes unsupported instruction in scalar FU.

Also, the hardware may use an implicit lockstep predicate value, to avoid conventional vector instructions from impacting results of lockstep instructions generated corresponding to scalar operations (see the checking of main vector processing discussed below). By using an implicit lockstep predicate value (i.e. a fixed designation of the lane reserved for lockstep checking of the main processing and hardware-implemented masking of effects of checking instructions on other lanes), there is no need to include instructions for managing the lockstep predicates in the predicate registers 70, which can improve performance not only due to executing fewer instructions, but also because there is reduced predicate register pressure. Also this can save ISA encoding space.

Another hardware assisted feature can be to replicate vector status flags to provide a separate set of vector status flags for use by the lockstep checking instructions. This avoids pollution of conventional vector flags by lockstep instructions, so that intra core lockstep for vectorised code can be supported without needing compiler support to avoid adverse effects from flag pollution, and improves error coverage when existing code is executed in a lockstep manner by the modified hardware. The branch execution unit 32 can check the relevant scalar and vector flags on executing a conditional branch instruction, to ensure that they match, and if there is a match, execute the branch as usual, while if there is a mismatch between the scalar and vector flags, a "fault" exception can be raised as this indicates a divergence between the main and checker processing.

Also, special purpose registers (e.g. the program counter, status registers, processor mode bits) can be replicated. Some processor designs may typically share a set of special purpose registers between the scalar and vector processing circuitry, but by replicating a second set for lockstep checking, this provides increased error detection coverage since errors in the special purpose registers can now be detected too. Similarly, address computations for branch targets and memory (load/store) instructions could be replicated to increase error coverage. The hardware overhead of replicating address computations would typically be moderate as most processors may already include multiple integer ALUs 34 suitable for address computation.

The above examples for hardware modifications simplify the adaption of intra core lockstep (by making it software transparent), reduce its performance penalty and increase its error detection coverage. It will be appreciated that it is not essential to include all of these modifications—any combination of the techniques discussed above can be selected depending on the desired trade-off between development cost and improved performance/error coverage. Further modifications, such as wider queues or a longer issue window, may be considered to further reduce the performance penalties imposed by the increased number of micro ops.

Lockstep Checking for Vector Instructions

The example of FIG. 2 shows the utilization of a single vector lane to run in lockstep with scalar execution units and registers. Assuming that the execution of conventional vector instructions is prohibited in this form of scalar lockstep scheme, the underlying vector architecture does not require any form of predication. The use of a lockstep predicate $P_{lockstep}$ as illustrated in FIG. 2 merely reduces the number of undesired operations and therefore yields higher energy efficiency.

Figure 9:
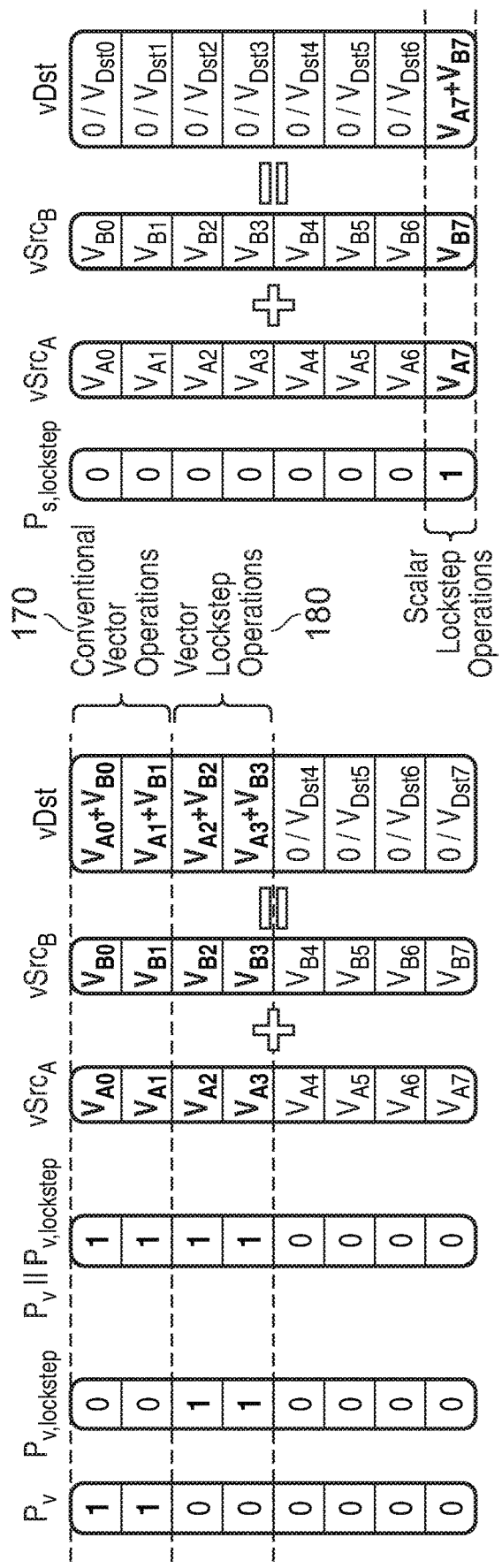
FIG. 9 shows an example where the main processing is vector processing performed on a subset of lanes of the vector processing circuitry, and the checker processing is executed on a further subset of lanes of the vector processing circuitry.

However, it is also possible to execute conventional vector instructions as part of a scalar & vector lockstep scheme. In this case, as shown in FIG. 9, main vector processing 170 can be checked by mapping the operands from a first subset of lanes to a second subset of lanes corresponding to checker processing 180, and running the main and checker processing within the respective subsets of lanes of the same vector instruction (or alternatively within respective subsets of lanes in different vector instructions).

In the vector lockstep case, further partitioning of vectors is provided to avoid interference between independent operations. For example, FIG. 9 illustrates the partitioning of an 8-element vector into:

Two elements reserved for conventional vector operations,

Two elements reserved for equivalent vector lockstep operations

One element reserved for scalar lockstep operations, and 3 unused elements

It would also be possible for the conventional vector operations and the vector lockstep checking operations to operate on three 64-bit elements each. However, some processors may implement the vector processing unit such that the maximum vector length may need to be a multiple of a certain number of bits (e.g. 128 bits), and depending on the data element size (e.g. 64 bits), algorithms relying on this property may not support vectors holding an odd number of data elements. Hence, designs favouring lockstep operations may either discourage such algorithms and force the number of regular and lockstep lanes to be an even number, or provide a modified datapath to support odd multiples of elements.

The management of predicates to ensure isolation of the vector partitions introduced above can be performed as follows. The predicates used for particular instructions depend on their type:

Scalar lockstep operations use a scalar lockstep predicate value $P_{s,lockstep}$ which has a bit value of 1 in the scalar checking lane and bit value of 0 in other lanes;

scalar lockstep operations include any vector operations executed in an effort to mirror scalar operations.

The scalar lockstep predicate $P_{s,lockstep}$ prevents corruption of data held in the remaining vector elements, which would help enable sharing of the same vector register between lockstep checking instructions and regular vector instructions.

However, unless $P_{s,lockstep}$ is supported by all vector instructions (either explicitly within the instruction encoding, or implicitly with the hardware introducing the predicate for the scalar lockstep vector instructions), a number of vector registers would need to be reserved for scalar lockstep operations to prevent pollution of other lanes used by regular vector instructions. This would increase vector register pressure and increase compiler complexity.

Unpredicated instructions use either $P_v \| P_{v,lockstep}$ (with 1s in the lanes used by the main vector processing and the lanes used to check the outcome of the main vector processing) or $IP_{s,lockstep}$ (the inverse of the scalar lockstep predicate, with 1s in all lanes other than the scalar checking lane).

some vector architectures may primarily predicate certain floating point instructions, memory accesses and inter lane operations (e.g. reductions).

As vector lockstep operations are expected to mirror conventional vector operations, only the element reserved for scalar lockstep would need to be disabled to prevent data corruption.

Implementations that do not provide explicit or implicit means to predicate instructions for this purpose would reserve a number of vector registers exclusively for scalar lockstep operations.

Predicated instructions would use $P_v$ for conventional vector instructions (with 1s in the lanes reserved for main vector processing), or $P_{v,lockstep}$ for lockstep vector instructions (with 1s in the lanes reserved for the checking of the main vector processing).

For example, memory accesses can use $P_v$ to limit memory accesses to conventional vector operations:

Loads: perform inter lane move (or element wise shift+OR) to replicated loaded elements in vector lockstep partition Stores: prior to store, perform inter lane comparison (or element wise shift+CMP) to ensure match between conventional and lockstep vector elements, branch to fault handler on mismatch Inter lane operations (e.g. reductions or permutes) would isolate individual partitions, e.g. repeat same instruction once using $P_v$ and once using $P_{v,lockstep}$.

The complexity regarding the generation of predicates depends on the degree of ISA and hardware support provided (see above). Some vector architectures may support permute instructions required to perform the data movements required by the vector loads and stores described above. They can also supports means to mirror predicate bits corresponding to conventional vector elements into bits corresponding to lockstep vector elements. However, most architectures would not support the isolation of individual partitions as required by certain inter lane operations, so similar to the above described handling of inter-lane vector instruction, such inter lane predicate generating instructions would be executed twice (once using $P_v$ and once using $P_{v,lockstep}$).

Unless all instructions can be predicated, the partitions reserved for scalar and vector operations would be physically isolated, by using separate registers. One example of ISA support to resolving this may be to use an additional opcode bit per unpredicated vector instruction to select between the $P_{s,lockstep}$ and $IP_{v,lockstep}$ (the inverse of $P_{v,lockstep}$) with the register holding the predicate being predetermined by the architecture. A lockstep aware decoder would mitigate this opcode overhead by automatically selecting the corresponding predicate, e.g. $P_{s,lockstep}$ for scalar lockstep operations generated when decoding scalar instructions. The ISA or hardware modifications discussed above may also be used to improve the coverage of permanent faults, by ensuring that conventional and corresponding lockstep operations are executed in different functional units.

The detection of permanent faults for the execution of conventional vector instruction may require vector functional units to be split. In particular, a four element wide addition may be executed by using two FUs, each operating on two elements. Lockstep operations could then ensure execution in different FUs. While this would not necessarily impact performance of non-lockstep protected code, it may increase hardware complexity.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An error detection method for a data processing apparatus comprising scalar processing circuitry to perform scalar processing of scalar operands and vector processing circuitry to perform vector processing comprising a plurality of lanes of processing performed on vector operands comprising a plurality of data elements;

the method comprising:
executing main processing comprising main scalar processing on the scalar processing circuitry;
executing checker processing using at least one lane of said plurality of lanes on the vector processing circuitry, the checker processing comprising operations corresponding to at least part of the main processing; and
performing error detection in dependence on a comparison of an outcome of said at least part of the main processing and an outcome of the checker processing.

2. The method of claim 1, wherein the checker processing is executed on a different hardware functional unit to the main processing.

3. The method of claim 1, wherein the comparison of the outcome of said at least part of the main processing and the outcome of the checker processing is performed on performing a store operation for storing data resulting from the main processing to a data store.

4. The method of claim 3, wherein the comparison of the outcome of said at least part of the main processing and the outcome of the checker processing is performed in response to a store instruction for controlling the data processing apparatus to perform said store operation for storing data resulting from the main processing to the data store.

5. The method of claim 1, wherein operands or status information for the main processing are stored in a different part of hardware register storage to operands or status information for the checker processing.

6. The method of claim 1, wherein on performing a load operation of the main scalar processing for loading data from a data store to a scalar register file, the loaded data is also loaded to a part of the vector register file corresponding to said at least one lane used for the checker processing.

7. The method of claim 6, wherein the loading of data to said part of the vector register file corresponding to said at least one lane is performed in response to an instruction for controlling the load operation of the main scalar processing.

8. The method according to claim 1, wherein at least one vector register of a vector register file is reserved for use by said checker processing.

9. The method according to claim 1, wherein said plurality of lanes comprise at least one checker lane reserved for the checker processing.

10. The method according to claim 9, wherein said at least one checker lane includes a scalar checker lane reserved for performing the checker processing when the main processing comprises the main scalar processing.

11. The method according to claim 10, wherein instructions for controlling the vector processing circuitry to perform the checker processing corresponding to the main scalar processing are associated with predicate information for controlling the vector processing circuitry to mask an outcome of said plurality of lanes other than said scalar checker lane.

12. The method according to claim 10, wherein instructions for controlling the vector processing circuitry to perform the checker processing are associated with predicate information for controlling the vector processing circuitry to mask an outcome of said scalar checker lane.

13. The method according to claim 1, comprising decoding a sequence of instructions including instructions for controlling the data processing apparatus to perform the main processing, the checker processing and the error detection.

14. The method according to claim 13, wherein at least one instruction of the sequence of instructions specifies annotation information indicating that the checker processing is to be performed on a different hardware functional unit to the main processing.

15. The method according to claim 1, wherein the data processing apparatus comprises an instruction decoder for decoding instructions;
wherein in response to a scalar-vector comparison instruction, when the main processing comprises said main scalar processing, the instruction decoder controls the data processing apparatus to perform said comparison of the outcome of said at least part of the main processing and the outcome of the checker processing.

16. The method according to claim 15, wherein the scalar-vector comparison instruction specifies a given scalar register, and said comparison comprises a comparison of a value in the given scalar register with a value in a data element of a vector register used by the checker processing.

17. The method according to claim 15, wherein said comparison comprises a comparison of one or more scalar status flags set in response to the main scalar processing with one or more vector status flags set in response to the checker processing.

18. The method according to claim 15, wherein the instruction decoder is responsive to the scalar-vector comparison instruction to control the data processing apparatus to conditionally branch to a target instruction address in dependence on the outcome of said comparison.

19. The method according to claim 1, wherein the data processing apparatus has a plurality of modes of operation including:
a first mode in which the checker processing is executed in addition to said main processing; and
a second mode in which execution of the checker processing is suppressed.

20. The method according to claim 1, wherein the data processing apparatus comprises an instruction decoder to map a first sequence of instructions comprising instructions defining the main processing to a second sequence of instructions comprising instructions defining the main processing and the checker processing, and to control the data processing apparatus to perform data processing based on the second sequence of instructions.

21. The method according to claim 20, wherein the second sequence of instructions also comprises instructions for controlling the data processing apparatus to perform said comparison of the outcome of said at least part of the main processing and the outcome of the checker processing.

22. The method according to claim 20, wherein the instruction decoder is configured to map a scalar instruction of the first sequence of instructions to a scalar instruction and a checker vector instruction of the second sequence of instructions.

23. The method according to claim 20, wherein in response to a scalar instruction of the first sequence of instructions corresponding to an operation unsupported by the vector processing circuitry in response to a single vector instruction, the instruction decoder performs one of:
triggering an exception condition; or
mapping the scalar instruction to two or more vector instructions of the second sequence of instructions for performing a combined operation corresponding to the operation of the scalar instruction; or
mapping the scalar instruction to two or more identical scalar instructions to be executed on the scalar processing circuitry.

24. The method according to claim 1, wherein the vector processing circuitry comprises at least one hardware functional unit providing functionality required for a scalar instruction which is not required for any vector instruction of an instruction set architecture supported by the data processing apparatus;
wherein the checker processing is executed using said at least one hardware functional unit.

25. A method of compiling a sequence of instructions for execution by a data processing apparatus comprising scalar processing circuitry to perform scalar processing of scalar operands and vector processing circuitry to perform vector processing comprising a plurality of lanes of processing performed on vector operands comprising a plurality of data elements; the method comprising:
receiving a first sequence of instructions defining main processing to be executed by the data processing apparatus, the main processing comprising main scalar processing to be executed using the scalar processing circuitry; and
mapping the first sequence of instructions to a second sequence of instructions comprising instructions for controlling the data processing apparatus to execute at least:
the main processing;
checker processing executed using at least one lane of said plurality of lanes, the checker processing comprising operations corresponding to at least part of the main processing; and
an error detection operation dependent on a comparison of an outcome of said at least part of the main processing and an outcome of the checker processing.

26. A non-transitory storage medium containing a computer program for controlling a data processing apparatus to perform the method of claim 1.

27. A data processing apparatus comprising:
scalar processing circuitry to perform scalar processing of scalar operands;
vector processing circuitry to perform vector processing comprising a plurality of lanes of processing performed on vector operands comprising a plurality of data elements; and
control circuitry to control the vector processing circuitry to perform checker processing using at least one lane of said plurality of lanes, the checker processing comprising operations corresponding to at least part of main processing comprising main scalar processing processed on the scalar processing circuitry; and error detection circuitry to perform error detection in dependence on a comparison of an outcome of said at least part of the main processing and an outcome of the checker processing.

28. The method according to claim 1, wherein the main processing also comprises main vector processing using a subset of said plurality of lanes of the vector processing circuitry.

* * * * *